US012784353B2

United States Patent
Watanabe

(10) Patent No.: US 12,784,353 B2
(45) Date of Patent: Nov. 3, 2026

(54) INFORMATION PROCESSING APPARATUS, INFORMATION PROCESSING METHOD, AND STORAGE MEDIUM USED FOR CROSS REALITY (XR) SUCH AS VIRTUAL REALITY, MIXED REALITY, AND AUGMENTED REALITY

(71) Applicant: CANON KABUSHIKI KAISHA, Tokyo (JP)

(72) Inventor: Takabumi Watanabe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 204 days.

(21) Appl. No.: 18/674,021

(22) Filed: May 24, 2024

(65) Prior Publication Data

US 2024/0394972 A1 Nov. 28, 2024

(30) Foreign Application Priority Data

May 25, 2023 (JP) ................................ 2023-086289

(51) Int. Cl.
*G06T 17/00* (2006.01)
*G06T 15/10* (2011.01)
*G06T 17/10* (2006.01)
*G06T 19/20* (2011.01)

(52) U.S. Cl.
CPC .................................. *G06T 17/005* (2013.01)

(58) Field of Classification Search
CPC ......... G06T 17/10; G06T 19/00; G06T 19/20; G06T 2210/12; G06T 2219/008; G06T 2219/2021; G06T 2207/30241; G06T 5/30; G06T 7/75; G06T 17/205; G06T 2207/30172; G06T 2207/20044; G06T 15/10; G06T 7/13; G06T 7/155; G06F 30/10; G06F 30/00; B33Y 50/00; G06V 10/426; G06V 10/34; G06V 10/457; G06V 20/653
See application file for complete search history.

(56) References Cited

U.S. PATENT DOCUMENTS 11,900,537 B2 * 2/2024 Borduas .................... G06T 7/20
12,008,716 B2 * 6/2024 Mason .................. G06T 17/205
2007/0266039 A1 * 11/2007 Boykin ..................... G06F 8/34
707/999.102

(Continued)

FOREIGN PATENT DOCUMENTS

JP H10143682 A 5/1998
JP 2007072916 A 3/2007
JP 2008197776 A 8/2008

*Primary Examiner* — Wesner Sajous
(74) *Attorney, Agent, or Firm* — Canon U.S.A, Inc. IP Division

(57) ABSTRACT

An information processing apparatus includes one or more processors configured to acquire geometric inclusion relationship of three-dimensional models that constitute a scene represented by computer graphics, acquire operation information from a user, determine a three-dimensional model to be simplified among the three-dimensional models that constitute the scene and simplification processing to be performed on the three-dimensional model to be simplified, based on the inclusion relationship and the operation information, and perform the determined simplification processing on the three-dimensional model to be simplified.

17 Claims, 10 Drawing Sheets

(56) References Cited

U.S. PATENT DOCUMENTS

| | | | | |
|---|---|---|---|---|
| 2008/0062171 | A1* | 3/2008 | Kim | G06T 17/20<br>345/423 |
| 2014/0058708 | A1* | 2/2014 | Sakairi | G06F 30/10<br>703/1 |
| 2021/0256763 | A1* | 8/2021 | Huang | G06T 19/20 |

* cited by examiner

INFORMATION PROCESSING APPARATUS, INFORMATION PROCESSING METHOD, AND STORAGE MEDIUM USED FOR CROSS REALITY (XR) SUCH AS VIRTUAL REALITY, MIXED REALITY, AND AUGMENTED REALITY

BACKGROUND

Field of the Disclosure

The present disclosure relates to an information processing technique used for cross reality (XR) such as virtual reality, mixed reality, and augmented reality.

Description of the Related Art

In recent years, a system providing cross reality such as virtual reality (VR), mixed reality (MR), and augmented reality (AR) to a user has been realized. The XR is a comprehensive general term of a technique such as VR, MR, and AR for merging a real world and a virtual world to create new experience.

In a field such as XR handling a three-dimensional computer graphics (CG) model, culling processing performed on the CG model is known as a technique for improving processing efficiency of CG drawing. For example, a CG model present outside a visual field and a CG model hidden by a shielding object are culled to enhance processing efficiency of CG drawing, which makes it possible to realize substantially real-time CG drawing.

Japanese Patent Application Laid-Open No. 2007-72916 discusses a technique for previously determining a viewpoint position and previously deleting a CG model not coming into a visual field from the viewpoint position.

In a case where the above-described culling of the CG model is performed, it is necessary to determine the CG model to be culled in each frame, and overhead is generated. Therefore, deletable data is required to be previously deleted. However, the CG model to be deleted and a deletion method depend on a use scene. For this reason, determination by a person is necessary, and a large number of manual works are generated. In contrast, in a case of the technique discussed in Japanese Patent Application Laid-Open No. 2007-72916, the CG model not coming into the visual field is previously deleted based on the previously determined viewpoint position. Thus, the manual works by the person can be reduced to some extent. However, in XR such as VR, MR, and AR, flexibility and a range of a possible viewpoint at runtime are large. Accordingly, the CG model that may essentially come into the visual field is previously deleted in some cases.

SUMMARY

According to an aspect of the present disclosure, an information processing apparatus includes one or more processors configured to acquire geometric inclusion relationship of three-dimensional models that constitute a scene represented by computer graphics, acquire operation information from a user, determine a three-dimensional model to be simplified among the three-dimensional models that constitute the scene and simplification processing to be performed on the three-dimensional model to be simplified, based on the inclusion relationship and the operation information, and perform the determined simplification processing on the three-dimensional model to be simplified.

Further features of the present disclosure will become apparent from the following description of exemplary embodiments with reference to the attached drawings.

DESCRIPTION OF THE EMBODIMENTS

Figure 1:
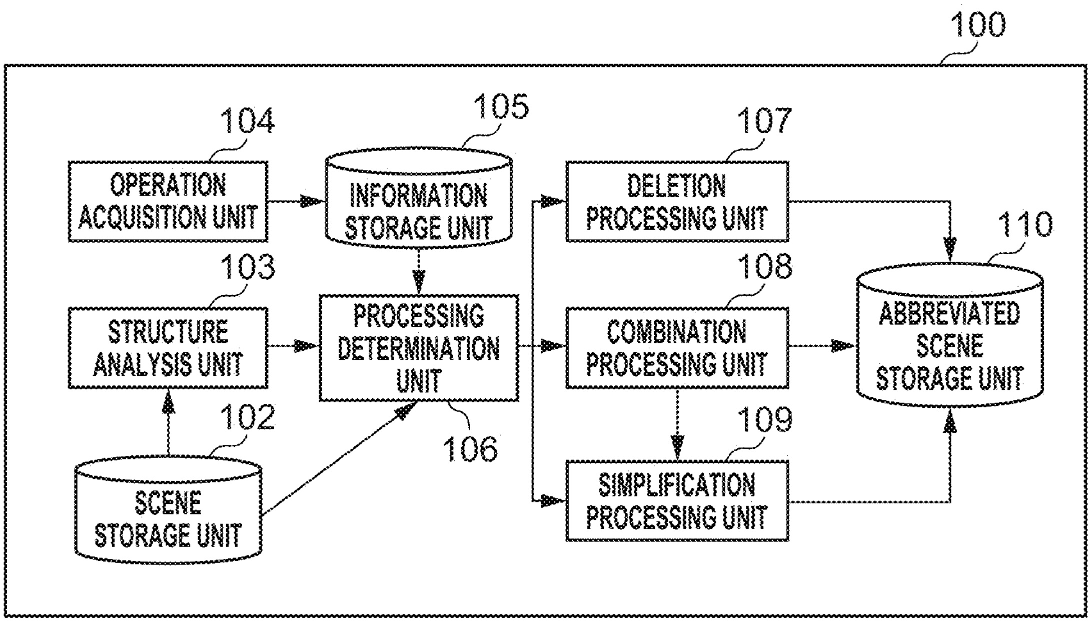
FIG. 1 is a diagram illustrating a configuration example of an information processing apparatus according to one or more aspects of the present disclosure.

Some exemplary embodiments of the present disclosure are to be described with reference to drawings. The present disclosure is not limited to the following exemplary embodiments, and all of combinations of features described in the exemplary embodiments are not necessarily essential for solving means of the present disclosure. Configurations of the exemplary embodiments can be appropriately corrected or changed depending on a specification of an apparatus to which the present disclosure is applied and various kinds of conditions (such as use condition and use environment). Parts of the exemplary embodiments described below may be appropriately combined. The following exemplary embodiments are to be described while the same components are denoted by the same reference numerals.

A first exemplary embodiment is to be described. In the present exemplary embodiment, a system providing cross reality (XR) such as virtual reality (VR), mixed reality (MR), and augmented reality (AR) to a user is described as an example. In the present exemplary embodiment, as an application example of an information processing apparatus, a wearable terminal in which processing performance of a central processing unit (CPU) and a graphics processing unit (GPU) is limited is assumed, but the information processing apparatus may be a stationary personal computer or workstation. The wearable terminal is not limited to a wearable device such as a smartphone and may be a computer mounted on a housing same as a head-mounted display (HMD), and a form thereof is not limited.

The information processing apparatus according to the present exemplary embodiment has a function of acquiring a plurality of viewpoint positions assumed when the user uses XR, through interactive operation input. Each of the viewpoint positions may include, in addition to a coordinate position in a three-dimensional space of XR (hereinafter, referred to as XR space), a direction from the viewpoint position (line-of-sight direction), and a size of a visual field.

The information processing apparatus according to the exemplary embodiment improves processing efficiency of CG drawing by deleting, among three-dimensional computer graphics (CG) models, a model that hardly comes into the visual field of the user based on the viewpoint positions. However, in a case where the three-dimensional model is deleted based on only the viewpoint positions, when the user observes the XR space from a viewpoint other than the viewpoint positions, a case where the three-dimensional model that should essentially come into the visual field has been deleted may occur. In particular, in XR such as VR, MR, and AR, flexibility and a range of a possible viewpoint at runtime are large. For this reason, in the case where the three-dimensional model is deleted based on only the viewpoint positions, a case where the three-dimensional model that should be essentially displayed is not displayed may occur.

The information processing apparatus according to the present exemplary embodiment analyzes geometric inclusion relationship of a plurality of three-dimensional models that constitute a scene represented by CG in the XR space, and generates a tree structure (referred to as inclusion structure tree) indicating the inclusion relationship of the three-dimensional models. In the following, the scene represented by CG is referred to as a CG scene, and the three-dimensional models are referred to as CG models. Details of processing for analyzing the geometric inclusion relationship of the CG models are to be described below. The information processing apparatus specifies a CG model that cannot come into visual fields from various viewpoint positions possibly used for observation of the XR space, based on the inclusion structure tree and the above-described viewpoint positions acquired through the interactive operation input, and performs predetermined simplification processing on the specified CG model.

In the present exemplary embodiment, the predetermined simplification processing includes at least any of deletion processing for deleting the above-described specified CG model, simplification processing for simplifying a shape of a specified CG model, and a combination processing for combining specified CG models. The CG models to be combined are CG models that are present at the same coordinate system and can be regarded to be combined as a rigid body. In the present exemplary embodiment, an example including the deletion processing, the simplification processing, and the combination processing is described, but the processing may be appropriately combined, for example, only the deletion processing is used, the deletion processing and the simplification processing may be combined, or the deletion processing and the combination processing may be combined. Details of the deletion processing, the simplification processing, and the combination processing are to be described below. The information processing apparatus according to the present exemplary embodiment performs the simplification processing to reduce a processing load at the time of rendering a CG scene.

FIG. 1 is a block diagram illustrating a functional configuration example of an information processing apparatus 100 according to the first exemplary embodiment. Each of functional units in the information processing apparatus 100 illustrated in FIG. 1 is realized by, for example, a CPU, a GPU, or a circuit.

In FIG. 1, a scene storage unit 102 stores information on a scene graph that indicates CG models of a CG model group that constitutes a CG scene and parent-child relationship of coordinates. The information on the scene graph stored in the scene storage unit 102 is information previously generated.

A structure analysis unit 103 is a relationship acquisition unit that analyzes geometric inclusion relationship structure indicating which CG model is present in which CG model, from the scene graph stored in the scene storage unit 102, acquires inclusion relationship of the CG models, and holds the inclusion relationship as an inclusion structure tree. Details of the analysis of the geometric inclusion relationship of the CG models, and details of the inclusion structure tree are to be described below.

An operation acquisition unit 104 acquires operation information that is anticipated to be input from the user at the time of using XR, through previous interactive operation input. The operation information acquired by the operation acquisition unit 104 is stored in an information storage unit 105.

As the operation information anticipated to be input from the user at the time of using XR, information on a viewpoint position designated by the user, information designating a CG model to be held and moved by the user in the XR space, and the like are considered. In the present exemplary embodiment, the operation acquisition unit 104 acquires coordinate information on a plurality of viewpoint positions in a three-dimensional space through the interactive operation input. The coordinates of the viewpoint group input by the user may be input, for example, through a two-dimensional user interface (UI) including a three-dimensional (3D) view, or by numerical values. In addition, the user operation information may be directly designated using a controller, hand gesture, and the like in a three-dimensional space using, for example, a head-mounted display (HMD).

Further, as a workflow of contents of the CG scene, a flow in which a stationary computer or the like having abundant calculation resources is previously used, and the contents are then used on a wearable terminal having limited calculation resources is considered. In a case where the stationary computer or the like having abundant calculation resources is used, the operation acquisition unit 104 may acquire coordinate information on a viewpoint trajectory in which movement of the viewpoint at the time of using XR is anticipated, and information on operation history of the CG model that is anticipated to be moved by the user.

A processing determination unit 106 determines the simplification processing to be performed on each of the CG models by a deletion processing unit 107, a combination processing unit 108, and a simplification processing unit 109 on a subsequent stage, based on the inclusion structure tree acquired in the analysis processing by the structure analysis unit 103 and the operation information stored in the information storage unit 105. In the present exemplary embodiment, as described above, the simplification processing includes the deletion processing for deleting any of the CG models, the combination processing for combining any of the CG model with another CG model, and the simplification processing for simplifying a shape of any of the CG models. In other words, the processing determination unit 106 specifies a CG model to be deleted, CG models to be combined, and a CG model to be simplified in shape, based on the inclusion structure tree and the operation information. Details of processing for specifying the CG model are to be described below.

The processing determination unit 106 transmits the information on the scene graph stored in the scene storage unit 102 and information on the CG model specified to be deleted, to the deletion processing unit 107. The processing determination unit 106 transmits the information on the scene graph and information on the CG models specified to be combined, to the combination processing unit 108. The processing determination unit 106 transmits the information on the scene graph and information on the CG model specified to be simplified, to the simplification processing unit 109.

The deletion processing unit 107 performs the deletion processing for deleting the CG model specified by the processing determination unit 106 as the CG model to be deleted, among the CG models in the scene graph.

The combination processing unit 108 performs the combination processing for combining the CG models specified by the processing determination unit 106 as the CG models to be combined, among the CG models in the scene graph.

The simplification processing unit 109 performs the simplification processing on the CG model specified by the processing determination unit 106 as the CG model to be simplified, among the CG models in the scene graph. In the present exemplary embodiment, as the simplification processing, polygon reduction processing is performed. The processing determination unit 106 also determines whether to simplify a combined CG model subjected to the combination processing. Accordingly, in a case where the combined CG model is specified as a CG model to be simplified, the simplification processing unit 109 also performs the simplification processing on the combined CG model.

An simplified scene storage unit 110 stores information on a scene graph of a CG scene reflecting a result of the above-described simplification processing including the deletion processing, the combination processing, and the simplification processing. The scene storage unit 102 and the simplified scene storage unit 110 may be the same unit. In this case, the CG scene stored in the scene storage unit 102 is overwritten with the information after the simplification processing. At the time of actually using XR, the XR space based on the CG scene subjected to the simplification processing is provided to the user. In other words, at the time of actually using XR, CG drawing high in processing efficiency with the CG scene subjected to the simplification processing is performable. Accordingly, even the wearable terminal having limited processing performance of the CPU and the GPU can provide a substantially real-time XR space.

Figure 2:
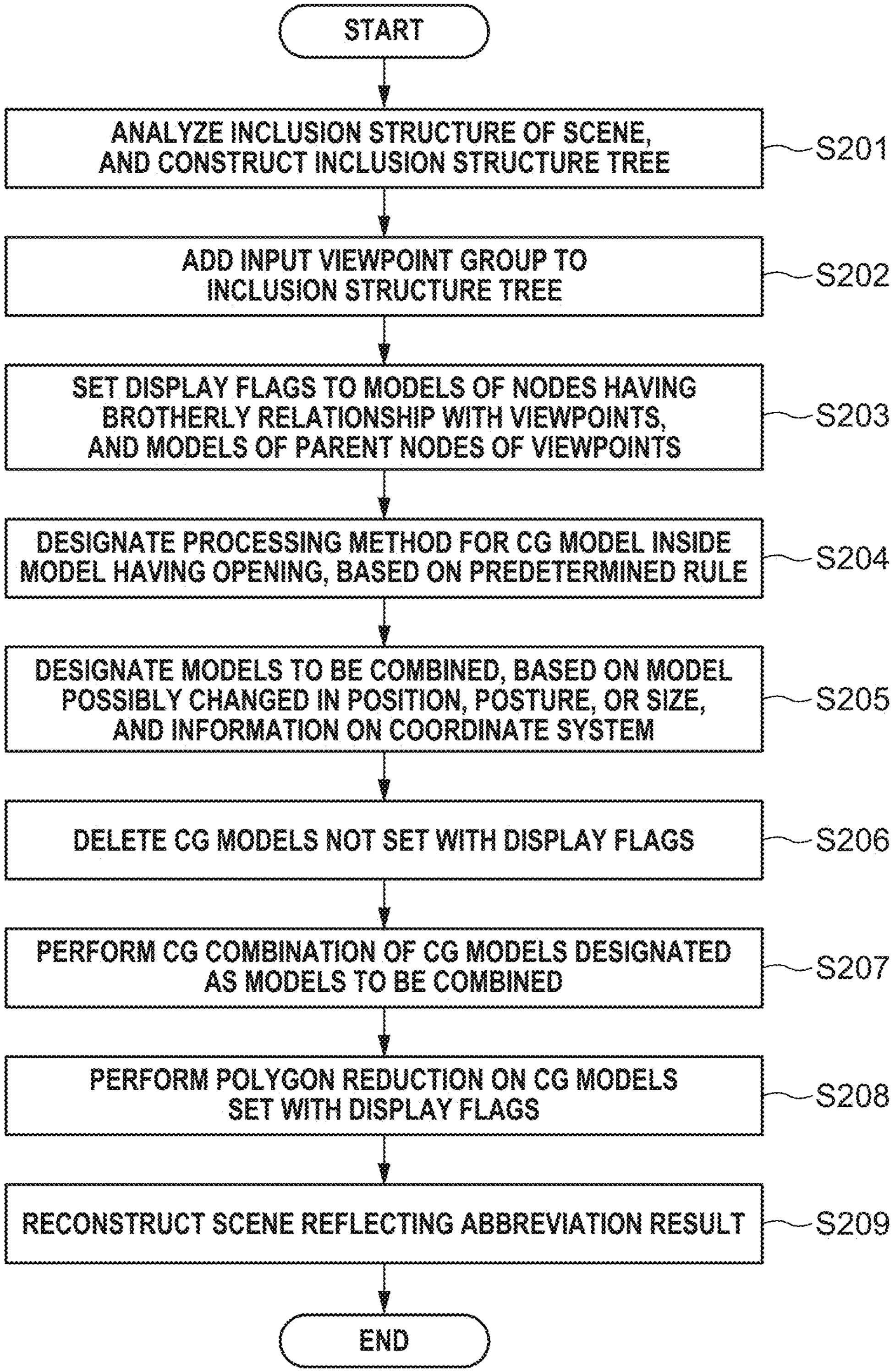
FIG. 2 is a flowchart of information processing according to one or more aspects of the present disclosure.

FIG. 2 is a flowchart illustrating a flow of information processing to be performed by the information processing apparatus 100 according to the present exemplary embodiment. In a case where the functional configuration illustrated in FIG. 1 of the information processing apparatus 100 according to the present exemplary embodiment is realized by the CPU, an information processing program according to the present exemplary embodiment is a program causing the CPU to execute the processing illustrated in the flowchart of FIG. 2. Among processing in steps in the flowchart of FIG. 2, processing in step S201 is performed by the structure analysis unit 103, and processing in steps S202 to S205 is performed by the processing determination unit 106. Processing in step S206 is performed by the deletion processing unit 107, processing in step S207 is performed by the combination processing unit 108, processing in step S208 is performed by the simplification processing unit 109, and processing in step S209 is performed by the simplified scene storage unit 110.

In step S201, the structure analysis unit 103 analyzes the geometric inclusion relationship structure of the CG models based on the scene graph stored in the scene storage unit 102, and acquires (generates) the inclusion structure tree. The inclusion structure tree may be generated corresponding to the whole of the CG scene. However, for example, in a case where an object of the CG model is moved in the CG scene, the inclusion relationship may be changed. For this reason, the structure analysis unit 103 may generate the inclusion structure tree for each sub-scene included in the CG scene. In other words, in this case, the structure analysis unit 103 may generate the inclusion structure tree for each sub-scene of each coordinate system possibly moved with movement of the object of the CG model in the CG scene. Alternatively, the structure analysis unit 103 may generate the inclusion structure tree every time a moving position of the CG model (object) moving in the CG scene is changed. In a case where the inclusion structure tree is generated for each sub-scene or each change of the moving position, the inclusion structure trees are switched and used in response to switching of the sub-scene or change of the moving position.

Figure 3:
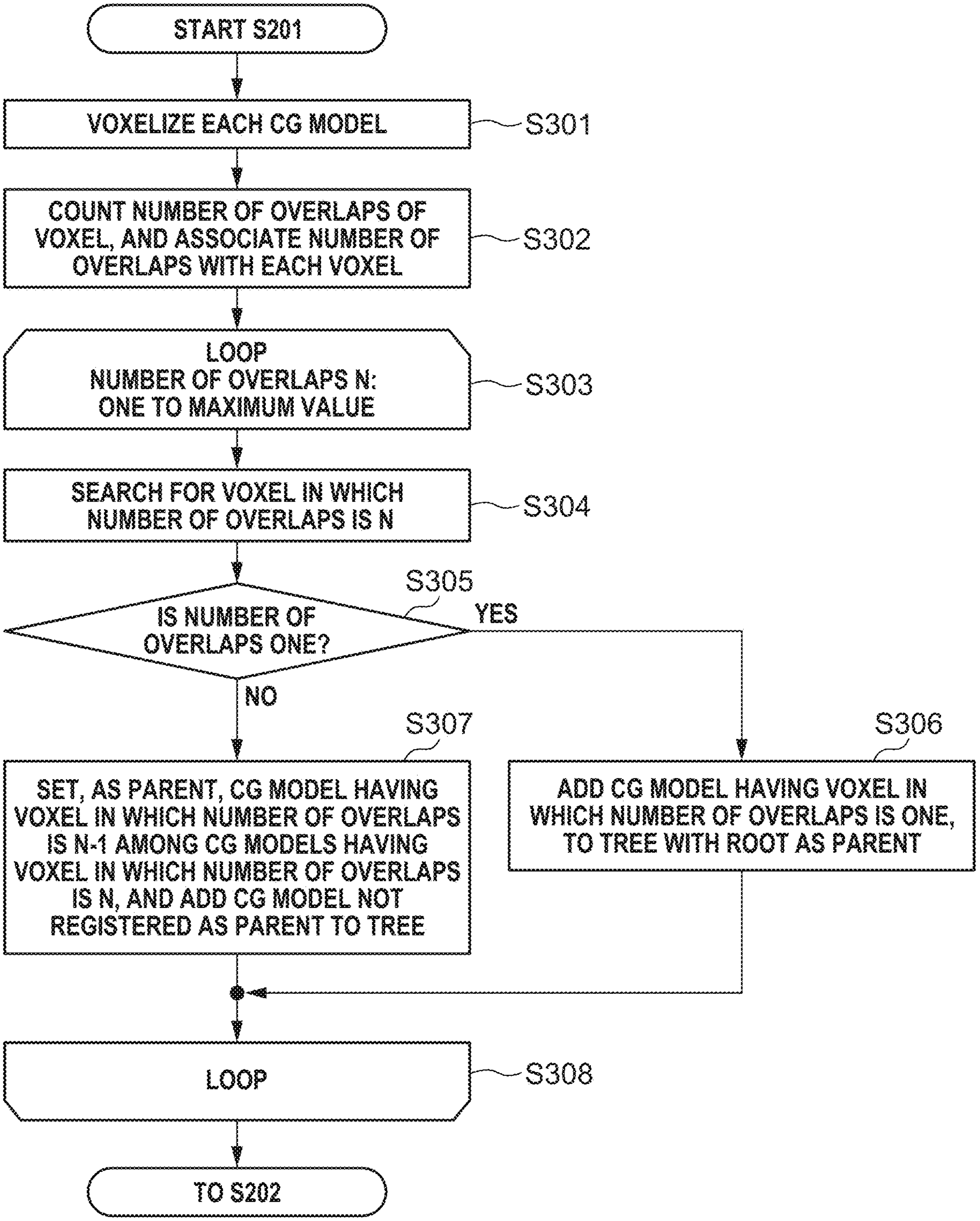
FIG. 3 is a flowchart of processing for acquiring inclusion relationship.

FIG. 3 is a flowchart illustrating a flow of processing for acquiring (generating) the inclusion structure tree by the structure analysis unit 103.

In step S301, the structure analysis unit 103 voxelizes each of the CG models in the CG scene to be analyzed. At this time, an inside of a polygon as an outermost outline is filled with voxels. In a case of a CG model including an opening, the opening is appropriately filled with predetermined algorithm. Each of the voxels may be represented by a cube having a predetermined side length or by an octree.

In step S302, the structure analysis unit 103 counts, in a case where the voxels of the CG models in the CG scene to be analyzed are arranged in the three-dimensional space, the number of overlaps of the voxels of the CG models, and associates the number of overlaps with each of the voxels.

The processing performed by the structure analysis unit 103 in step S302 is to be described with reference to FIG. 4 and FIG. 5.

Figure 4:
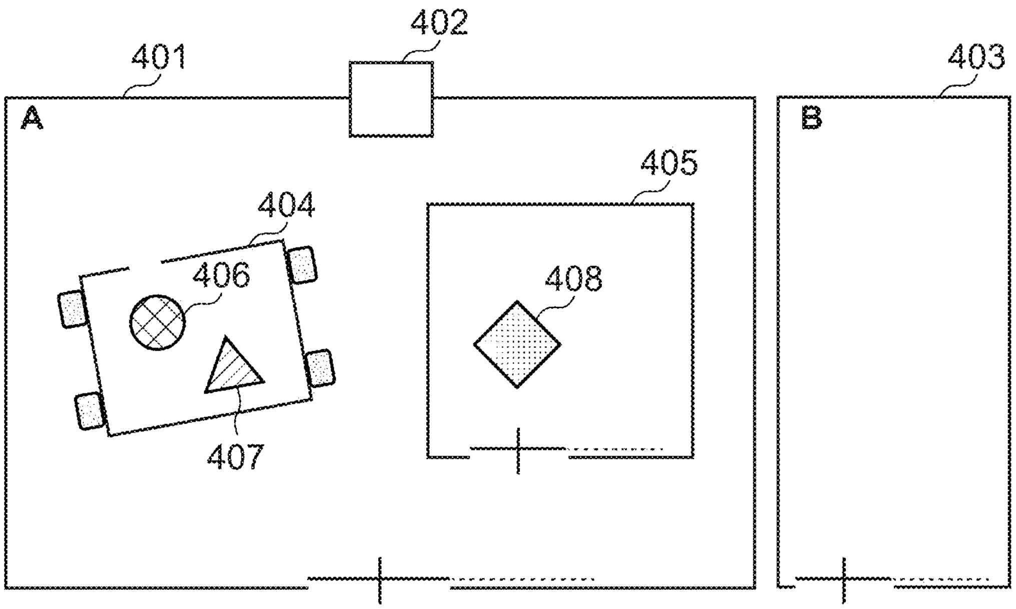
FIG. 4 is a diagram illustrating computer graphics (CG) model examples used for description of inclusion relationship acquisition.

FIG. 4 is a diagram illustrating a state where the CG models included in the CG scene to be analyzed are arranged in the three-dimensional space as viewed from above, and two-dimensionally illustrating the state such that CG models and the like present inside each of the CG models are viewable. In an example illustrated in FIG. 4, a room A 401, a column 402, a room B 403, a wagon 404 with casters, a small room 405, a spherical object 406, a triangular object 407, and a rhombic object 408 each represents a CG model. In other words, the CG scene includes the room A 401 and the room B 403, and the column 402 is disposed in the room A 401 while straddling an inside and an outside of the room A 401. The small room 405 and the wagon 404 with casters are present in the room A 401, the rhombic object 408 is present in the small room 405, and the spherical object 406 and the triangular object 407 are stored in the wagon 404.

Figure 5:
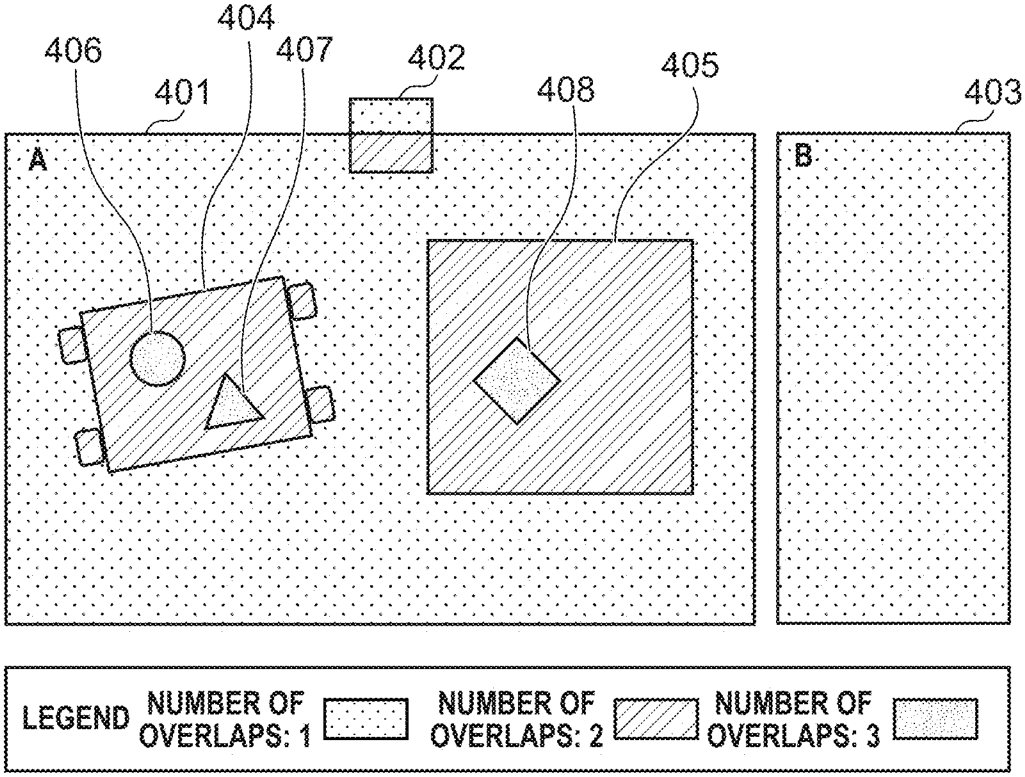
FIG. 5 is a diagram used for description of examples of the CG models and the number of overlaps of voxels.

FIG. 5 is a diagram illustrating voxels after the voxelization processing in step S301 is performed on the CG scene illustrated in FIG. 4, and the number of overlaps acquired by counting the number of overlaps of the voxels in step S302. As illustrated in FIG. 5, the room A 401 and the room B 403 that are positioned on the outermost side in the three-dimensional space of the CG scene each overlap with no region. Accordingly, the number of overlaps of each of the room A 401 and the room B 403 is one. The small room 405 and the wagon 404 are present in the room A 401. Accordingly, the number of overlaps of each of the small room 405 and the wagon 404 is two. The rhombic object 408 is present in the small room 405, and the spherical object 406 and the triangular object 407 are stored in the wagon 404. Accordingly, the number of overlaps of each of the rhombic object 408, the spherical object 406, and the triangular object 407 is three. In the case of the column 402, the number of overlaps of a region present in the room A 401 is two, and the number of overlaps of a region present outside the room A 401 is one.

The structure analysis unit 103 repeatedly performs loop processing from step S303 to step S308 on regions from a region in which the number of overlaps is one to a region in which the number of overlaps is a maximum value (three in example illustrated in FIG. 5) in order.

In step S304 in the loop processing, the structure analysis unit 103 searches for a voxel (region) in which the number of overlaps is N (N is 1 to maximum value) that is a processing target of the current loop processing.

In step S305, the structure analysis unit 103 determines whether the number of overlaps N is one (whether N is one or not). In a case where the number of overlaps N is one (YES in step S305), the processing proceeds to step S306. In a case where the number of overlaps N is not one, namely, in a case where the number of overlaps N is two or more (NO in step S305), the processing proceeds to step S307.

In step S306, the structure analysis unit 103 performs processing for connecting the CG model having the voxel in which the number of overlaps is one, as a node to the inclusion structure tree. The CG model having the voxel in which the number of overlaps is one is a CG model partially or wholly disposed on the outermost side in the three-dimensional space of the CG scene. Accordingly, in step S306, the structure analysis unit 103 determines the CG model having the voxel in which the number of overlaps N is one, as a node directly connected to a root node of the inclusion structure tree.

In step S307, the structure analysis unit 103 performs processing for adding the CG model having the voxel in which the number of overlaps N is not one (number of overlaps N is two or more), as a node to the inclusion structure tree. The structure analysis unit 103 at this time determines, among all of the CG models sharing the voxel in which the number of overlaps N is not one, a CG model in which the number of overlaps N is N−1, as a parent node, determines the CG models not registered as the parent node, as child nodes, and adds CG models to the inclusion structure tree.

Figure 6:
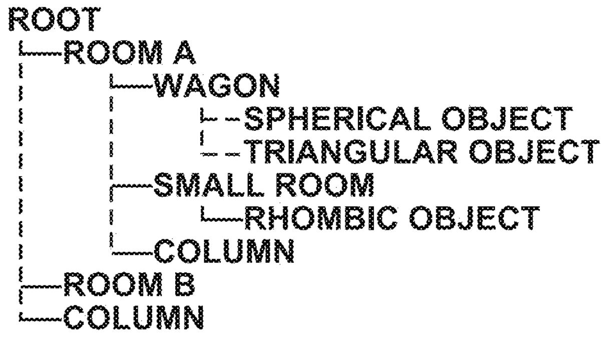
FIG. 6 is a diagram illustrating an example of an inclusion structure tree.

FIG. 6 is a diagram illustrating an example of the inclusion structure tree generated by the processing in the flowchart of FIG. 3, in the example of the CG scene illustrated in FIG. 4 and FIG. 5. In the case of the CG scene illustrated in FIG. 4 and FIG. 5, in the inclusion structure tree, nodes of the room A and the room B are directly connected to the root node, and a node of the column present in both of the inside and the outside of the room A is a child node having both of the room A and the root node as parent nodes, as illustrated in FIG. 6. Nodes of the wagon, the small room, and the column are child nodes having the room A as a parent node, and are brother nodes having brotherly relationship. Nodes of the spherical object and the triangular object are child nodes (brother nodes) having the wagon as a parent node. A node of the rhombic object is a child node having the small room as a parent node.

In the present exemplary embodiment, the example in which the voxels are used to determine the inclusion relationship of the CG models in the above-described manner is described. However, the determination is not limited to usage of the voxels. For example, the inclusion structure tree can be configured by clarifying inside/outside relationship of the CG models. Accordingly, a bounding box or a convex hull may be generated for each of the CG models, and the inside/outside relationship may be approximately determined using the information. Furthermore, interference determination in units of polygons and the inside/outside determination by the bounding box or the convex hull may be combined to perform the inside/outside determination with higher accuracy. In a case where the CG models are provided as solid models, the inside/outside determination may be performed by Boolean operation or the like without using the voxels.

Referring back to the flowchart in FIG. 2, the description is continued.

In step S202 after step S201 described above, the processing determination unit 106 specifies a viewpoint group input by the user based on the operation information that is acquired by the operation acquisition unit 104 and stored in the information storage unit 105, and adds the viewpoint group to the inclusion structure tree. For example, the processing determination unit 106 adds viewpoints of the viewpoint group as nodes on the inclusion structure tree, by using a rule similar to the rule described with reference to the flowchart in FIG. 3, based on coordinate values of the viewpoints of the viewpoint group.

Figure 7:
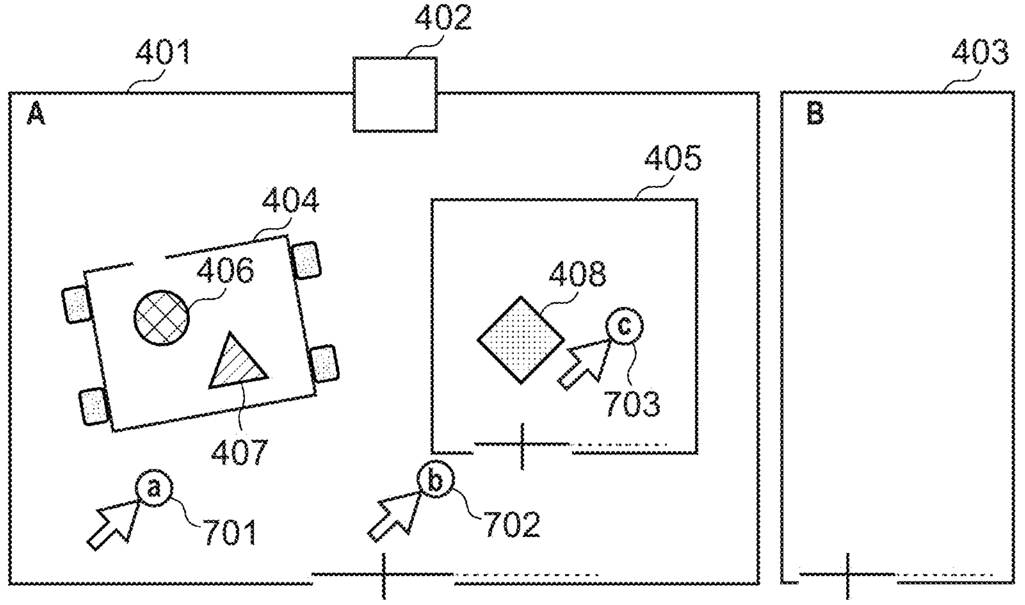
FIG. 7 is a diagram illustrating examples of the CG models and viewpoint positions.

FIG. 7 illustrates an example in which a viewpoint a 701, a viewpoint b 702, and a viewpoint c 703 are input as the viewpoints of the viewpoint group to the CG scene illustrated in FIG. 4 described above.

Figure 8:
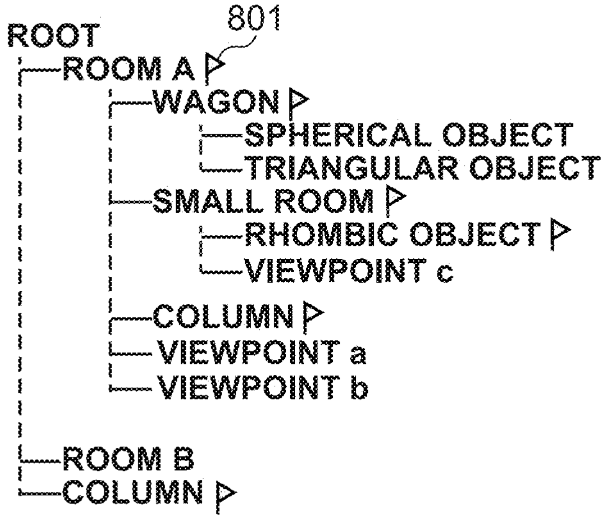
FIG. 8 is a diagram illustrating an example of the inclusion structure tree to which viewpoints are added and display flags.

FIG. 8 illustrates the inclusion structure tree after the viewpoints a 701, b 702, and c 703 illustrated in FIG. 7 are added as the nodes to the inclusion structure tree illustrated in FIG. 6 generated based on the example illustrated in FIG. 4 and FIG. 5. The viewpoint a 701 and the viewpoint b 702 illustrated in FIG. 7 are present in the room A 401. Accordingly, the number of overlaps of each of the viewpoint a 701 and the viewpoint b 702 is two. For this reason, in the inclusion structure tree in FIG. 8, the viewpoint a and the viewpoint b are added as child nodes (brother nodes) having the room A as a parent node and as nodes having brotherly relationship with the column. The viewpoint c 703 illustrated in FIG. 7 is present in the small room 405, and the number of overlaps thereof is three. Accordingly, in the inclusion structure tree in FIG. 8, the viewpoint c is added as a child node having the small room as a parent node and as a node having brotherly relationship with the rhombic object.

In step S203, the processing determination unit 106 sets a predetermined flag to a CG model possibly coming into the visual field in the XR space at the time of using XR, based on the relationship of the nodes in the inclusion structure tree illustrated in FIG. 8. In the present exemplary embodiment, the CG model set with the predetermined flag is the CG model possibly coming into the visual field in the XR space, in other words, the CG model possibly displayed at the time of using XR. For this reason, in the following, the predetermined flag is referred to as a display flag 801. In the present exemplary embodiment, the processing determination unit 106 sets the display flag to each of the CG models of the nodes having the brotherly relationship with any of the nodes of the viewpoints, the CG models of the nodes having relationship of the parent node with any of the nodes of the viewpoints, and the CG models present in any of the CG models of the parent nodes. More specifically, in the case of the inclusion structure tree in FIG. 8, the display flag is set to each of the room A as the parent node of the viewpoints a and b, the wagon, the small room, and the column as the brother nodes of the viewpoints a and b, the small room as the parent node of the viewpoint c, and the rhombic object as the brother node of the viewpoint c.

For example, in a case where a CG model is present inside another CG model having an opening, the CG model inside the CG model having the opening may be viewed from outside through the opening. However, in a case where the display flag is set to the CG model having the opening whereas the display flag is not set to the child node that has the CG model having the opening as the parent node in the inclusion structure tree, the CG model of the child node is deleted or hidden. In other words, in this case, the CG model of the child node possibly essentially viewed through the opening is deleted or hidden.

To cope with such a case, the processing determination unit 106 performs, as the processing in step S204, one or more of first processing, second processing, and third processing described below in combination.

The first processing is processing for setting, in a case where a size of the opening of the CG model is greater than or equal to a predetermined threshold, the display flag indicating a display target to the CG model having relationship of the child node with the CG model having the opening.

The second processing is processing for setting, in a case where the CG model having the relationship of the child node with the CG model having the opening is present in a predetermined region from the opening, the display flag indicating the display target to the CG model of the child node. In a case where the second processing is performed, the processing determination unit 106 determines, for example, a conical region within a predetermined angle range from a normal vector of the opening, as a predetermined region, and sets the display flag to the CG model of the child node interfering with the conical region. The predetermined region is not limited to the conical region as a matter of course.

The third processing is processing for setting a plurality of viewpoints surrounding the CG model having the opening, and setting the display flag to the CG model that comes into any of the visual fields of the viewpoints and has the relationship of the child node with the CG model having the opening. Positions, angles, and the number of viewpoints surrounding the CG model having the opening may be optionally determined based on a calculation time and desired precision.

In the above-described example, the possibility that the CG model present inside the CG model having the opening is viewed from outside through the opening is described. However, in a case where the CG model inside the CG model having the opening also has an opening, outside may be viewed from the inside of the CG model through the openings. In other words, a case where the CG model of the child node that has the CG model having the opening as the parent node and is present inside the CG model of the parent node also has the opening and a node of a viewpoint is present inside the CG model of the child node is also conceivable. At this time, for example, in a case where the node of the viewpoint is absent outside the CG model of the parent node, the display flag is not set to the CG model present outside the CG model of the parent node. In other words, in this case, although the CG model present outside the CG model of the parent node may be viewed from the inside of the CG model of the child node through the opening of the CG model of the child node and the opening of the CG model of the parent node, the CG model present outside the CG model of the parent node is deleted or hidden.

To cope with such a case, the processing determination unit 106 according to the present exemplary embodiment performs the processing performed on the child node of the CG model having the opening in the first processing and the second processing described above, on the parent node of the CG model having the opening.

In other words, in a case where the size of the opening of the CG model of the child node is greater than or equal to the predetermined threshold, the processing determination unit 106 sets the display flag to the CG model of the parent node that has such a CG model as the child node, as the first processing.

In a case where the opening of the CG model of the parent node that has the CG model having the opening as the child node is present within the predetermined region from the opening of the CG model of the child node, the processing determination unit 106 sets the display flag to the CG model of the parent node. In the case of this example, a conical region within a predetermined angle range from a normal vector of the opening of the CG model of the child node can be determined as the predetermined region. In a case where the opening of the CG model of the parent node interferes with the conical region, the processing determination unit 106 sets the display flag to the CG model of the parent node.

In step S205 after step S204 described above, the processing determination unit 106 specifies CG models to be combined in the combination processing by the combination processing unit 108 on a subsequent stage. In the present exemplary embodiment, a CG model possibly changed in position or posture at the time of using XR is previously designated on the scene graph. Accordingly, based on the CG model, the processing determination unit 106 determines the CG models in which a relative position and a posture are not changed. Further, the processing determination unit 106 determines the CG model under the node on the same coordinate system in the scene graph, as the CG model that may become a combination target.

The processing determination unit 106 regards that relative position and posture are not changed between the CG model under the node designated as the CG model possibly changed in position or posture, and each of the other CG models in the scene graph, among sub-scene graphs on the same coordinate system that may become combination targets. The processing determination unit 106 may perform the processing in step S205 by using sizes of the CG models in addition to the positions and the postures.

The processing determination unit 106 sets a combination flag to the CG model under the node possibly changed in relative position, posture, or size to the CG model of the parent node, thereby specifying the CG model under the node as the combination target.

In step S206, the deletion processing unit 107 performs the deletion processing (or hiding processing) on the CG model not set with the above-described display flag.

In step S207, the combination processing unit 108 performs the combination processing for combining the CG model under the node set with the combination flag in step S205. More specifically, the combination processing unit 108 searches for the CG model under the node set with the combination flag, and performs combination on a mesh set with the same material or texture in the found CG model.

In step S208, the simplification processing unit 109 performs the simplification processing for reducing the number of polygons of the mesh, on the CG models set with the above-described display flags and the CG model combined in step S207. As algorithm for reducing the polygon, a well-known method is usable, and is not particularly designated. The number of polygons to be reduced may be changed based on, for example, the size of the CG model, a distance from the set viewpoint position, whether the CG model is a child node of the model having the opening, and the size of the opening. An upper limit value of the number of polygons in the entire CG scene may be set, and the number of polygons to be reduced in each of the CG models may be determined such that the number of polygons in the entire CG scene does not exceed the upper limit value. Depending on application and performance of the information processing apparatus, the step itself may be omitted.

In step S209, the simplified scene storage unit 110 stores information on the scene graph of the CG scene reflecting the result of the simplification processing from step S201 to step S208.

As described above, in the information processing apparatus according to the first exemplary embodiment, the simplification processing for simplifying the model not coming into the visual field when the viewpoint is changed during XR experience is performed based on the inclusion structure tree indicating the inclusion relationship of the CG models and the information on the viewpoints by user operation. In the present exemplary embodiment, at the time of using XR, the XR space of the CG scene reflecting the result of the simplification processing is provided to the user. In other words, according to the present exemplary embodiment, it is possible to shorten a work time of the user by expanding an automation range of a reduction work of the CG models based on the premise of XR usage, and to suppress occurrence of a state where the CG model possibly coming into the visual field is deleted.

In the first exemplary embodiment, the information for performing the simplification processing is generated only from the scene graph including the CG models. In a second exemplary embodiment, application to MR and AR in which a CG model is superimposed on a real space is considered, and an example in which a structure of a real object and the like in the real space is considered to further expand the application range of the simplification processing is described. In other words, in a case where the CG model is superimposed on the real space, the CG model not displayed due to occlusion of the real object in the real space and a part thereof can be previously omitted. For this reason, it is possible to reduce CG drawing processing in rendering and occlusion determination processing of the real object.

Figure 9:
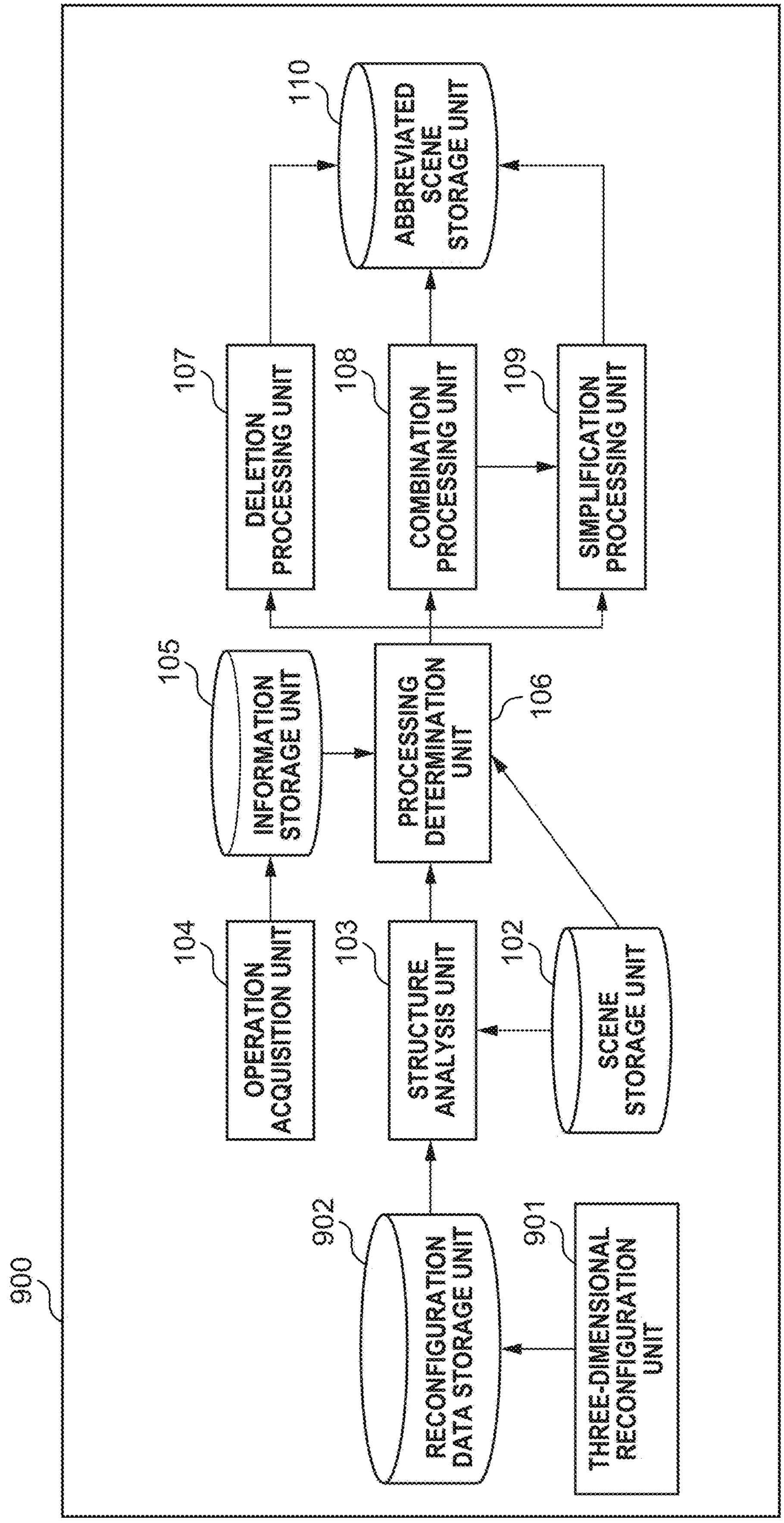
FIG. 9 is a diagram illustrating a configuration example of an information processing apparatus according to one or more aspects of the present disclosure.

FIG. 9 is a block diagram illustrating a functional configuration example of an information processing apparatus 900 according to the second exemplary embodiment. The information processing apparatus 900 according to the second exemplary embodiment includes, in addition to the functional units illustrated in FIG. 1, a three-dimensional reconfiguration unit 901 and a reconfiguration data storage unit 902. The other functional units except for the three-dimensional reconfiguration unit 901 and the reconfiguration data storage unit 902 are substantially similar to the functional units described in the above-described first exemplary embodiment. Accordingly, in the following, the functional units and processing different from the first exemplary embodiment are mainly described.

The three-dimensional reconfiguration unit 901 acquires a three-dimensional model of a real space when the user experiences AR or MR, and a three-dimensional model of a real object present in the real space. A method of acquiring the three-dimensional models of the real space and the real object is not particularly limited. A method using a stereo camera and a depth sensor may be used, or a method of Structure from Motion by a monocular camera may be used. In addition, the three-dimensional models of the real space and the real object may be generated based on, for example, information on a structure of the real space manually input through a graphical user interface (GUI) or a three-dimensional user interface (3D UI).

The three-dimensional reconfiguration unit 901 reconfigures three-dimensional shapes of the real space and the real object by using one or two or more of the above-described methods in combination, thereby acquires the three-dimensional models. The three-dimensional reconfiguration unit 901 may appropriately divide the three-dimensional models acquired by the three-dimensional reconfiguration processing. The three-dimensional models may be manually divided using GUI or 3D UI, or may be divided by performing segmentation of machine learning. Information on the three-dimensional models acquired by the three-dimensional reconfiguration processing in the three-dimensional reconfiguration unit 901 is stored in the reconfiguration data storage unit 902.

The structure analysis unit 103 according to the second exemplary embodiment analyzes the inclusion structure of the CG scene in a manner similar to the above-described first exemplary embodiment, and generates a scene in which the CG models and the three-dimensional models of the real space stored in the reconfiguration data storage unit 902 are integrated. The structure analysis unit 103 generates the inclusion structure tree based on the scene in which the three-dimensional models of the real space and the CG models are integrated.

As a result, the inclusion structure tree according to the second exemplary embodiment is an inclusion structure tree in which nodes of the real space and the real object are added to the inclusion structure tree described in the above-described first exemplary embodiment.

To integrate the CG models in the CS scene and the three-dimensional models of the real space, it is necessary to make the coordinate system of the CG scene and the coordinate system of the real space coincident with each other. For this reason, in the present exemplary embodiment, a predetermined marker is disposed in the real space or a certain feature in the real space is used as a marker, and the marker in a captured image of the real space is defined as an origin coordinate for reconfiguration of the real space. The structure analysis unit 103 specifies the origin coordinate for reconfiguration of the real space from the marker in the captured image of the real space, and associates the origin coordinate in the coordinate system of the real space with the origin coordinate in the coordinate system of the CG scene. This makes it possible to make the coordinate system of the real space and the coordinate system of the CG scene coincident with each other. Alternatively, the coordinate system of the real space and the coordinate system of the CG scene may be manually made coincident with each other by using an interactive UI.

The information processing apparatus 900 according to the second exemplary embodiment performs the CG model simplification processing following the rule of the flowchart in FIG. 2 described in the first exemplary embodiment, on the scene in which the CG models and the three-dimensional models of the real space are integrated in the above-described manner. In the second exemplary embodiment, in step S203, the processing determination unit 106 does not set the display flags to the three-dimensional models of the real space and the real object. In the present exemplary embodiment, the processing determination unit 106 cancels setting of the display flag for the CG model that is viewable only from a place where a viewpoint cannot be present due to presence of the real object, among the CG models set with the display flags in step S203. In a case where the opening of the CG model is directed to the real object, and a distance from the opening to that real object is less than or equal to a threshold, the processing determination unit 106 cancels setting of the display flag of the node under the CG model having the opening in the inclusion structure tree in step S204.

In the second exemplary embodiment, the example in which the three-dimensional reconfiguration processing is performed by the three-dimensional reconfiguration unit 901 is described. However, the three-dimensional reconfiguration processing may be performed by an information processing apparatus different from the information processing apparatus performing the CG scene simplification processing. For example, the three-dimensional reconfiguration processing may be previously performed by a different mobile terminal or the like, and the simplification processing may be performed by a stationary information processing apparatus.

As described above, in the second exemplary embodiment, the inclusion structure tree is generated based on the scene in which the CG models and the three-dimensional models of the real space are integrated. In the second exemplary embodiment, the display flag is not set to the three-dimensional model of the real object, and the setting of the display flag for the CG model set with the display flag is appropriately canceled based on the positional relationship with the real object, thereby enlarging the range of the simplification processing. According to the second exemplary embodiment, it is possible to suppress occurrence of the state where the CG model possibly coming into the visual field is deleted, and to further shorten the work time of the user by enlargement of the range of the simplification processing, as compared with the first exemplary embodiment.

<Hardware Configuration Example>

Figure 10:
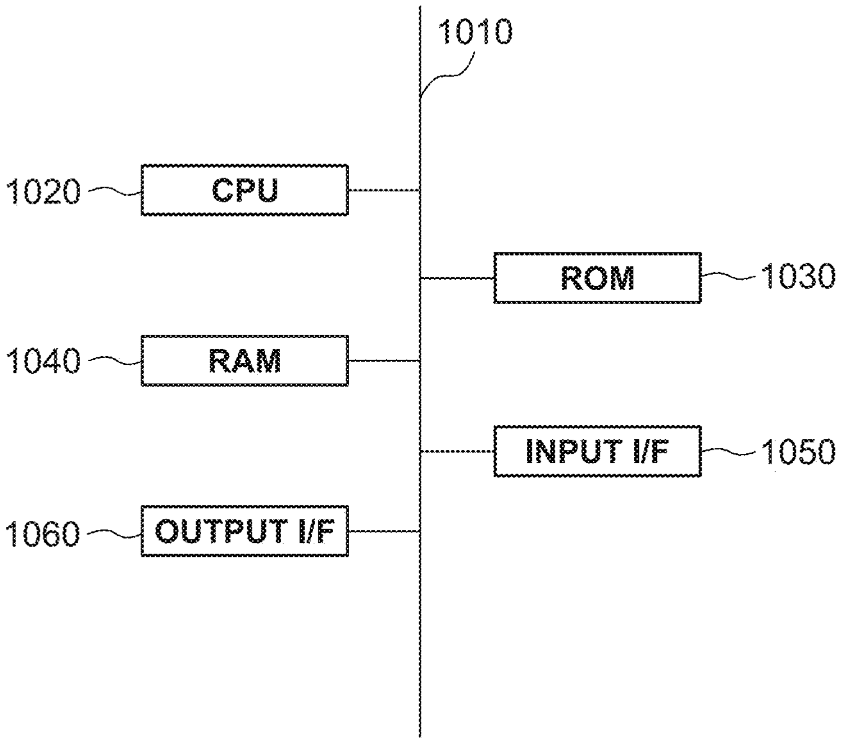
FIG. 10 is a diagram illustrating a hardware configuration example of the information processing apparatus.

FIG. 10 is a diagram illustrating a hardware configuration example that can implement the information processing apparatus according to each of the above-described first and second exemplary embodiments.

In FIG. 10, a CPU 1020 totally controls devices connected through a bus 1010. The CPU 1020 reads out and executes processing steps and programs stored in a read only memory (ROM) 1030. An operating system (OS), information processing programs according to the exemplary embodiments, device drivers, and the like are stored in the ROM 1030, are temporarily stored in a random access memory (RAM) 1040, and are appropriately executed by the CPU 1020. An input interface (I/F) 1050 inputs a signal from an external apparatus in a format processible by the information processing apparatus according to each of the exemplary embodiments. An output I/F 1060 outputs a signal in a format processible by an external apparatus.

The above-described functional units according to the first and second exemplary embodiments are realized when the CPU 1020 develops the programs stored in the ROM 1030 to the RAM 1040, and executes the information processing in the above-described flowcharts. For example, in a case where hardware is configured in substitution for software processing using the CPU 1020, a calculation unit and a circuit corresponding to the processing by the above-described functional units according to the first and second exemplary embodiment are configured. In other words, the functional units in the information processing apparatus according to each of the above-described exemplary embodiments may be all implemented by hardware, or may be partially implemented by software. In a case where the functional units are executed by software, the software is executed using the CPU 1020, the ROM 1030, the RAM 1040, and the like illustrated in FIG. 10.

The present disclosure can be realized by supplying programs realizing one or more functions of the above-described exemplary embodiments to a system or an apparatus through a network or a storage medium, and causing one or more general-purpose processors (e.g., CPUs) in a computer of the system or the apparatus to read out and execute the programs. The present disclosure can be realized by a dedicated processor (e.g., application specific integrated circuit (ASIC) or field programmable gate array (FPGA)) realizing one or more functions. Further, the present disclosure can be realized by a combination of the general-purpose processor and the dedicated processor. The processor indicates a processor in a broad sense, and includes the general-purpose processor and the dedicated processor. Operation of the processor may be executed not only by one processor, but also by cooperation of a plurality of processors provided at physically separated positions.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-086289, filed May 25, 2023, which is hereby incorporated by reference herein in its entirety.

What is claimed is:

1. An information processing apparatus comprising:

one or more processors configured to:

acquire geometric inclusion relationship of three-dimensional models that constitute a scene represented by computer graphics;

acquire operation information from a user;

determine a three-dimensional model to be simplified among the three-dimensional models that constitute the scene, and simplification processing to be performed on the three-dimensional model to be simplified, based on the inclusion relationship and the operation information; and perform the determined simplification processing on the three-dimensional model to be simplified, wherein, in the acquiring the geometric inclusion relationship, a tree structure including the three-dimensional models as nodes is acquired based on the geometric inclusion relationship of the three-dimensional models that constitute the scene, wherein the operation information includes information designating a position of a viewpoint for observing the scene, and wherein, in the determining, a node of the viewpoint is added to the tree structure based on the position of the viewpoint, and among the three-dimensional models that constitute the scene, a three-dimensional model possibly coming into a visual field of the viewpoint is specified based on relationship between the nodes of the three-dimensional models and the node of the viewpoint in the tree structure.

2. An information processing method comprising:

acquiring geometric inclusion relationship of three-dimensional models that constitute a scene represented by computer graphics;

acquiring operation information from a user;

determining a three-dimensional model to be simplified among the three-dimensional models that constitute the scene, and simplification processing to be performed on the three-dimensional model to be simplified, based on the inclusion relationship and the operation information; and performing the determined simplification processing on the three-dimensional model to be simplified, wherein, in the acquiring the geometric inclusion relationship, a tree structure including the three-dimensional models as nodes is acquired based on the geometric inclusion relationship of the three-dimensional models that constitute the scene, wherein the operation information includes information designating a position of a viewpoint for observing the scene, and wherein, in the determining, a node of the viewpoint is added to the tree structure based on the position of the viewpoint, and among the three-dimensional models that constitute the scene, a three-dimensional model possibly coming into a visual field of the viewpoint is specified based on relationship between the nodes of the three-dimensional models and the node of the viewpoint in the tree structure.

3. The information processing method according to claim 2, wherein the simplification processing is one or more of deletion processing for deleting or hiding a three-dimensional model, combination processing for combining three-dimensional models, and simplification processing for simplifying a three-dimensional shape.

4. The information processing method according to claim 2, wherein, in the determining, a three-dimensional model having relationship of a brother node with the node of the viewpoint and a three-dimensional model having relationship of a parent node with the node of the viewpoint in the tree structure are specified as the three-dimensional models possibly coming into the visual field of the viewpoint.

5. The information processing method according to claim 2, wherein, in the determining, a flag indicating the specified three-dimensional model is set to the tree structure.

6. The information processing method according to claim 2, wherein, in the determining, the three-dimensional model possibly coming into the visual field of the viewpoint is specified using one or more of first processing for determining a three-dimensional model having relationship of a child node with a three-dimensional model having an opening of a size greater than or equal to a predetermined threshold, as the three-dimensional model possibly coming into the visual field of the viewpoint, second processing for determining a three-dimensional model that is present in a predetermined region from the opening of the three-dimensional model and has relationship of a child node with the three-dimensional model having the opening, as the three-dimensional model possibly coming into the visual field of the viewpoint, and third processing for determining a three-dimensional model that comes into any of visual fields of viewpoints set at a plurality of positions surrounding the three-dimensional model having the opening and has relationship of a child node with the three-dimensional model having the opening, as the three-dimensional model possibly coming into the visual field of the viewpoint.

7. The information processing method according to claim 6, wherein, in the second processing in the determining, among three-dimensional models each having relationship of a child node with the three-dimensional model having the opening, a three-dimensional model interfering with a region within a predetermined angle range from a normal vector of the opening is determined as the three-dimensional model possibly coming into the visual field of the viewpoint.

8. The information processing method according to claim 2, wherein, in the acquiring the geometric inclusion relationship, the tree structure is acquired for each of sub-scenes included in the scene.

9. The information processing method according to claim 8, wherein each of the sub-scenes where the tree structure is acquired is a scene of each coordinate system that is movable with movement of the three-dimensional model in the scene.

10. The information processing method according to claim 2, wherein, in the acquiring the geometric inclusion relationship, the tree structure is acquired based on change of a moving position of the three-dimensional model moving in the scene.

11. The information processing method according to claim 2, wherein, in the acquiring the geometric inclusion relationship, the tree structure is acquired based on a number of overlaps of voxels of the three-dimensional models in a case where the three-dimensional models that constitute the scene are voxelized and the voxels are arranged in a three-dimensional space.

12. The information processing method according to claim 11, wherein, in the acquiring the geometric inclusion relationship, the tree structure is acquired by directly connecting a three-dimensional model having a voxel in which the number of overlaps is one, to a root node of the tree structure, and among three-dimensional models sharing a voxel in which the number of overlaps is two or more, determining a three-dimensional model having a voxel in which the number of overlaps is smaller by one, as a parent node, and determining a three-dimensional model not determined as the parent node, as a child node.

13. The information processing method according to claim 2, wherein, in the acquiring the operation information, the operation information is acquired using an interactive user interface.

14. The information processing method according to claim 2, wherein, in the acquiring the operation information, at least one of information designating a position of a viewpoint for observing the scene and information designating a three-dimensional model that is possibly changed in at least any of a position, a posture, and a size among the three-dimensional models that constitute the scene is acquired as the operation information.

15. The information processing method according to claim 2, wherein, in the acquiring the operation information, at least any of a trajectory of a position of a viewpoint by a user having previously experienced the scene and an operation history of the user to the three-dimensional models is acquired as the operation information.

16. The information processing method according to claim 2, further comprising acquiring a three-dimensional model of a real object in a real space, wherein, in the acquiring the geometric inclusion relationship, geometric inclusion relationship between the three-dimensional models of the computer graphics and the three-dimensional model of the real object is also acquired, and wherein the simplification processing determined in the determining includes processing for deleting or hiding any of the three-dimensional models of the computer graphics based on the three-dimensional model of the real object.

17. A non-transitory computer-readable storage medium storing a program that causes a computer to execute an information processing method, the information processing method comprising:

acquiring geometric inclusion relationship of three-dimensional models that constitute a scene represented by computer graphics;

acquiring operation information from a user;

determining a three-dimensional model to be simplified among the three-dimensional models that constitute the scene, and simplification processing to be performed on the three-dimensional model to be simplified, based on the inclusion relationship and the operation information; and performing the determined simplification processing on the three-dimensional model to be simplified, wherein, in the acquiring the geometric inclusion relationship, a tree structure including the three-dimensional models as nodes is acquired based on the geometric inclusion relationship of the three-dimensional models that constitute the scene, wherein the operation information includes information designating a position of a viewpoint for observing the scene, and wherein, in the determining, a node of the viewpoint is added to the tree structure based on the position of the viewpoint, and among the three-dimensional models that constitute the scene, a three-dimensional model possibly coming into a visual field of the viewpoint is specified based on relationship between the nodes of the three-dimensional models and the node of the viewpoint in the tree structure.

* * * * *